United States Patent [19]

Dietze

[11] 4,426,408
[45] Jan. 17, 1984

[54] METHOD OF DEPOSITION OF SILICON IN FINE CRYSTALLINE FORM

[75] Inventor: Wolfgang Dietze, Munich, Fed. Rep. of Germany

[73] Assignee: Siemens Aktiengesellschaft, Berlin and Munich, Fed. Rep. of Germany

[21] Appl. No.: 58,463

[22] Filed: Jul. 18, 1979

[30] Foreign Application Priority Data

Jul. 19, 1978 [DE] Fed. Rep. of Germany ....... 2831816

[51] Int. Cl.³ .............................................. C30B 23/06
[52] U.S. Cl. ....................................... 427/95; 156/613
[58] Field of Search ............... 156/613, 611, DIG. 73, 156/DIG. 64; 148/174; 427/89, 95; 118/715; 423/349

[56] References Cited

U.S. PATENT DOCUMENTS

| | | | |
|---|---|---|---|
| 3,120,451 | 2/1964 | Schmidt et al. | 117/106 |
| 3,172,857 | 3/1965 | Sirtl | 156/613 |
| 3,341,359 | 9/1967 | Rummel | 156/613 |
| 3,536,522 | 10/1970 | Cecil et al. | 156/613 |

FOREIGN PATENT DOCUMENTS 2727305 1/1979 Fed. Rep. of Germany .

Primary Examiner—Hiram H. Bernstein
Attorney, Agent, or Firm—Herbert L. Lerner; Laurence A. Greenberg

[57] ABSTRACT

Method of deposition of silicon in fine crystalline form upon a substrate from a silicon-containing reaction gas which includes, at a set mole ratio of the reaction gas and throughput selected for the deposition process, setting the deposition rate-determining temperature of the substrate, at the beginning of the deposition, at a temperature at least equal to optimal temperature for deposition of silicon thereon and, in accordance with consequent increase in thickness of the silicon deposited on the substrate, gradually reducing the temperature of the substrate while maintaining at a minimal value the other parameters determining the rate of deposition.

9 Claims, 1 Drawing Figure

U.S. Patent      Jan. 17, 1984      4,426,408
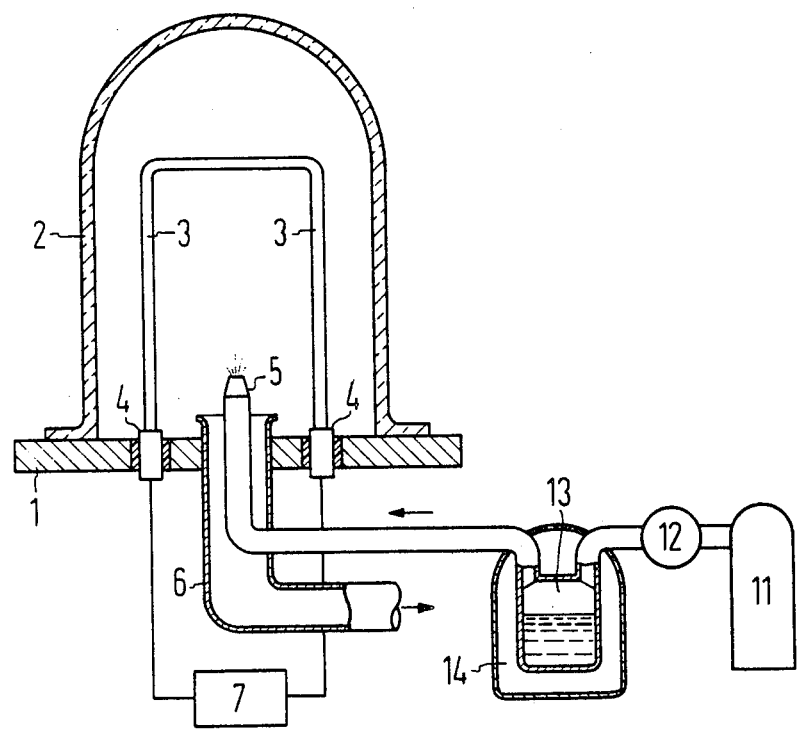

METHOD OF DEPOSITION OF SILICON IN FINE CRYSTALLINE FORM

The invention relates to a method of depositing silicon in fine crystalline form, more particularly, on a substrate preferably heated by direct passage of current therethrough, from an appropriate reaction gas especially formed of a silicon-halogen compound and hydrogen.

It has been known heretofore, in methods of deposition from the gaseous phase, to vary the parameters determining the deposition at the beginning or also during the deposition or precipitation process. It is furthermore known from U.S. Pat. No. 3,120,451 to operate, at the beginning of the deposition or precipitation process, with a lower throughput or flow rate of the flowing gas mixture, and gradually to increase the throughput or flow rate. The objective of this measure is to increase the purity of the silicon by preventing undesired boron precipitation or deposition.

As is well known, boron has a disadvantageous property or characteristic of being unable to be displaced appreciably during zone melting because the distribution coefficient thereof is nearly at 1, and of vaporizing into the vacuum only in very small quantities. Consequently, an effort is made to permit as little boron as possible to penetrate into the semiconductor material during the production thereof. The precipitation or deposition of boron is therefore prevented by operating with a smaller throughput or flow rate of the reaction gas mixture at the beginning of the precipitation or deposition process and, then, gradually increasing the throughput or flow rate.

The invention of the instant application, on the other hand, is based on a different effect. It has been found that during the production of polycrystalline silicon rods, a coarse crystalline growth occurs, at times, leading to the occurrence of considerable crystal lattice faults during subsequent production of monocrystalline rods from these polyrods in a crucible-free floating zone melting process.

For this purpose, it has been proposed heretofore in German Published Non-Prosecuted Patent Application No. DE-OS 27 27 305 to decrease or increase the mole ratio in the reaction gas as well as the precipitation or deposition temperature and the gas throughput or flow rate starting with a high mole ratio, a high gas throughput or flow rate and optimal precipitation or deposition temperature during the precipitation or deposition in accordance with a predetermined program.

In such a method, the mole ratio is advantageously set at 0.5 at the beginning of the precipitation or deposition and the optimal precipitation or deposition temperature to 1100° C. whereas, during the precipitation or deposition, a gas throughput or flow rate ranging from 3,000 to 15,000 liters per hour (l/h) is used. The gas throughput or flow rate, as is generally known, is the quantity of reaction gas flowing along the heated substrate per unit time. According to one exemplifying embodiment of the invention in this application, the mole ratio is lowered to 0.2 after precipitation or deposition for about 10 minutes at a high mole ratio.

It is accordingly an object of the invention to provide a method of deposition of silicon in fine crystalline form which avoids the disadvantages of the heretofore known as well as the heretofore proposed methods of this general type mentioned hereinbefore.

With the foregoing and other objects in view, there is provided in accordance with the invention, a method of deposition of silicon in fine crystalline form upon a substrate from a silicon-containing reaction gas which comprises, at a set mole ratio of the reaction gas and throughput selected for the deposition process, setting the deposition rate-determining temperature of the substrate, at the beginning of the deposition, at a temperature at least equal to optimal temperature for deposition of silicon thereon and, in accordance with consequent increase in thickness of the silicon deposited on the substrate, gradually reducing the temperature to a minimal value of the substrate while maintaining the other parameters determining the rate of deposition.

In accordance with another mode of the method invention, the temperature at the beginning of the deposition is optimal deposition temperature and is about 1100° C.

In accordance with a further mode of the method invention, the the temperature at the beginning of the deposition is above optimal temperature and is about 1150° C.

In accordance with an added mode of the method invention, minimal substrate temperature during the deposition is between about 1000° C. to 1050° C.

In accordance with an additional mode of the invention, the method comprises maintaining the throughput of the silicon-containing reaction gas constant during the deposition.

In accordance with yet another mode of the invention, the method comprises increasing throughput of the silicon-containing reaction gas with increasing thickness of the deposited silicon.

In accordance with yet a further mode of the method invention, the silicon-containing reaction gas is formed of a silicon-halogen compound and hydrogen.

In accordance with yet an added mode of the invention, the method includes passing an electric current directly through the substrate so as to heat the substrate.

In accordance with an additional mode of the method invention, the substrate is in the form of a silicon rod, and the increase in thickness of the silicon deposited on the substrate is an increase in diameter of the silicon rod.

In accordance with yet another mode of the method invention, the gradual reduction in the temperature of the substrate is continuous.

In accordance with a concomitant mode of the method invention, the gradual reduction in the temperature of the substrate is stepwise.

The idea upon which the invention of the instant application is based is that, in the production of polycrystalline silicon rods, a good silicon-halogen yield, on the one hand, and a good fine crystalline surface of the silicon, on the other hand, is obtained. Normally, both are not simultaneously attainable i.e. a better yield results, at the same time, in a correspondingly poorer silicon surface.

Heretofore, a good surface i.e. a fine crystalline surface, has been obtained only at the expense of the silicon-halogen yield and, in fact, either by decreasing the precipitation or deposition temperature or by increasing the silicon-halogen throughput or flow rate i.e. a high throughput or flow rate and/or a high mole ratio.

As indicated by the invention of the instant application, an improvement of the surface quality is achievable with respect to fine crystalline structure, however, without considerably impairing the silicon yield, if a constant temperature is not employed during the entire precipitation or deposition period but, rather, in accordance with the invention of the instant application, the temperature is gradually reduced so as to form new crystal nuclei or seed crystals.

Although the invention is illustrated and described herein as embodied in method of deposition of silicon in fine crystalline form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing in which the single FIGURE is a sectional view, partly diagrammatic and partly schematic of a device for performing the method of deposition of silicon in fine crystalline form in accordance with the invention.

Referring now to the FIGURE of the drawing, there is shown therein a device for depositing or precipitating polycrystalline silicon, made up of a metallic base plate 1 and, seated thereon, a hood 2 formed, for example, of quartz. Gas-tight electrodes 4 which are electrically insulated from one another extend through the metallic base plate 1 and are connected to respective ends of a rod-shaped substrate bent into the shape of a U, and formed of highly pure silicon. A nozzle 5 extends through the metallic base plate into the interior of the reaction chamber defined by the hood 2 and serves to supply fresh gas; according to the illustrated embodiment, the nozzle 5 is surrounded concentrically by an exhaust tube 6 for spent reaction gas mixture. The rod-shaped substrate 3 is heated by a power supply 7.

A reservoir 11 for hydrogen is provided for heating the reaction gas. The hydrogen flowing from the tank 11 passes through a flowmeter 12 and through an evaporator 13 which is filled with liquid silicochloroform, the evaporator 13 having an outlet which leads to the supply nozzle 5 in the reaction vessel. To adjust the temperature in the evaporator 13, the latter is housed in a thermostat 14. The amount of silicochloroform entrained in the hydrogen gas i.e. the mole ratio between silicochloroform and hydrogen, can be adjusted thereby.

The conventional methods of this general type are normally performed at constant temperature, the gas throughput or flow rate being increased with increasing diameter of the silicon rod. This soon results, however, in a very unduly heavy precipitation or deposition of silicon on the quartz-glass reactor, which contributes to impairment or deterioration thereof.

An increase in the gas throughput or flow rate is thereby sharply restricted, and passage can then be effected with good quality results yet only at constant throughput or flow rate.

According to the invention of the instant application, the silicon deposition or precipitation is begun with thin rods at high temperature of 1100° to 1150° C., and then the temperature is permitted to go down slowly with increasing rod diameter, for example, to 1000° to 1050° C. for a rod diameter of 50 mm. With a constant throughput or flow rate of the reaction gas, the silicon yield from the silicochloroform which is used is preserved in spite of the very low temperature because the silicon surface and the heat content of the reactor increase. Moreover, an increase in the gas throughput or flow rate and in the silicochloroform throughput or flow rate is possible without any impermissible or undue increase in the silicon precipitation or deposition on the quartz bell jar. Due to the very low temperature toward the end of the deposition process, the fine crystallinity of the surface is decidedly improved.

In comparison with the hereinaforementioned previously proposed method, the method according to the invention is more easily performed so that it is especially suited for mass production i.e. parallel operation of a great number of reactors for especially thick rods of, for example, 5" diameter and more. As an additional effect, which should not be underestimated, energy conservation of from 25 to 30% resulted from the method carried out in accordance with the invention.

The precipitations or depositions which also cause difficulties in maintaining cleanliness of the observation window especially for pyrometric measurements of the substrate temperature could virtually be suppressed entirely.

There are claimed:

1. Method for deposition of silicon in fine crystalline form upon a substrate from a silicon-containing gas which comprises, at a set mole ratio of the reaction gas and throughput selected for the deposition process, setting the deposition rate-determining temperature of the substrate, at the beginning of the deposition, at a temperature at least equal to optimal temperature for deposition of silicon thereon and, in accordance with consequent increase in thickness of the silicon deposited on the substrate, gradually reducing the deposition beginning temperature of the substrate throughout the deposition process to a minimal value near the end of the deposition process while maintaining the other parameters determining the rate of deposition.

2. Method according to claim 1 wherein the temperature of the beginning of the deposition is optimal deposition temperature and is about 1100° C.

3. Method according to claim 1 wherein the temperature at the beginning of the deposition is above optimal temperature and is about 1150° C.

4. Method according to claim 3 wherein minimal substrate temperature during the deposition is between about 1000° C. to 1050° C.

5. Method according to claim 1 wherein the silicon-containing reaction gas is formed of a silicon-halogen compound and hydrogen.

6. Method according to claim 1 which includes passing an electric current directly through the substrate so as to heat the substrate.

7. Method according to claim 1 wherein the substrate is in the form of a silicon rod, and the increase in thickness of the silicon deposited on the substrate is an increase in diameter of the silicon rod.

8. Method according to claim 1 wherein the gradual reduction in the temperature of the substrate is continuous.

9. Method according to claim 1 wherein the gradual reduction in the temperature of the substrate is stepwise.

* * * * *